United States Patent
Ren (10) Patent No.: US 11,543,862 B2
(45) Date of Patent: Jan. 3, 2023

(54) HINGE MECHANISM AND ELECTRONIC DEVICE

(71) Applicant: Lenovo (Beijing) Co., Ltd., Beijing (CN)

(72) Inventor: Chun Ren, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 6 days.

(21) Appl. No.: 17/207,104

(22) Filed: Mar. 19, 2021

(65) Prior Publication Data

US 2021/0405712 A1 Dec. 30, 2021

(30) Foreign Application Priority Data

Jun. 30, 2020 (CN) .......................... 202010617064.1

(51) Int. Cl.
*G06F 1/16* (2006.01)
(52) U.S. Cl.
CPC .................. *G06F 1/1681* (2013.01)
(58) Field of Classification Search
CPC .. G06F 1/1681; G06F 1/1616; F16C 2326/09; F16C 11/045; F16C 11/04; F16C 11/103; H04M 1/0216
See application file for complete search history.

(56) References Cited

U.S. PATENT DOCUMENTS

| | | | | |
|---|---|---|---|---|
| 4,875,252 A * | 10/1989 | Falconer | ............ | E05D 11/1021 16/370 |
| 8,627,547 B2 * | 1/2014 | Soh | ....... | E05D 11/0081 439/31 |
| 10,100,970 B1 * | 10/2018 | Wu | ........ | H05K 5/0226 |
| 10,435,933 B2 * | 10/2019 | Lin | ....... | H05K 5/0017 |
| 10,627,873 B2 * | 4/2020 | Lan | ........ | G06F 1/1616 |
| 10,905,020 B2 * | 1/2021 | Jan | ........ | H05K 5/0226 |
| 11,054,865 B2 * | 7/2021 | Jan | ......... | G06F 1/1618 |
| 2012/0090135 A1 * | 4/2012 | Soh | ........ | E05F 1/1253 16/250 |
| 2012/0120618 A1 * | 5/2012 | Bohn | .................... | G06F 1/1618 361/679.01 |
| 2018/0341295 A1 * | 11/2018 | Lan | ........ | G06F 1/1679 |
| 2019/0146560 A1 * | 5/2019 | Jan | ....... | H05K 5/0017 361/679.27 |
| 2019/0203512 A1 * | 7/2019 | Lin | ....... | G06F 1/1681 |
| 2020/0236801 A1 * | 7/2020 | Jan | ............ | E05D 3/18 |

FOREIGN PATENT DOCUMENTS

CN 205620858 U 10/2016
CN 110630628 A 12/2019

* cited by examiner

*Primary Examiner* — Anthony M Haughton
*Assistant Examiner* — Theron S Milliser
(74) *Attorney, Agent, or Firm* — Anova Law Group, PLLC (57) ABSTRACT

A hinge mechanism includes a hinge assembly connected with a first body and a second body to rotatably connect the first body and the second body, and a torque assembly mounted at the first body and connected with the hinge assembly. When the first body and the second body are relatively rotated to drive the hinge assembly, the hinge assembly drives the torque assembly to cause at least a part of the torque assembly to translate relative to the first body to provide a torque for the hinge assembly.

16 Claims, 6 Drawing Sheets

HINGE MECHANISM AND ELECTRONIC DEVICE

CROSS-REFERENCE TO RELATED APPLICATION

This application claims priority to Chinese Patent Application No. 202010617064.1, filed on Jun. 30, 2020, the entire content of which is incorporated herein by reference.

TECHNICAL FIELD

The present disclosure relates to the field of smart device and, in particular, to a hinge mechanism and an electronic device.

BACKGROUND

With expanding functions of electronic devices, such as mobile phones and computers, users not only have requirements for the functions of the electronic devices, but also have more requirements for the touch and feel and service life of the electronic devices. Many electronic devices, especially laptops, have a rotatable dual body structure that uses a hinge mechanism. However, in the hinge mechanism, the torque of a shaft often needs to be provided by shaft friction, which affects the service life of the shaft and makes it hard to control and adjust the torque.

SUMMARY

One aspect of the present disclosure provides a hinge mechanism including a hinge assembly connected with a first body and a second body to rotatably connect the first body and the second body, and a torque assembly mounted at the first body and connected with the hinge assembly. When the first body and the second body are relatively rotated to drive an action of the hinge assembly, the hinge assembly drives an action of the torque assembly to cause at least a part of the torque assembly to translate relative to the first body to provide a torque for the hinge assembly.

Another aspect of the present disclosure provides an electronic device including a first body, a second body, and a hinge mechanism rotatably connect the first body and the second body. The hinge mechanism includes a hinge assembly connected with a first body and a second body to rotatably connect the first body and the second body, and a torque assembly mounted at the first body and connected with the hinge assembly. When the first body and the second body are relatively rotated to drive an action of the hinge assembly, the hinge assembly drives an action of the torque assembly to cause at least a part of the torque assembly to translate relative to the first body to provide a torque for the hinge assembly.

Reference numerals: Hinge assembly 1; Torque assembly 2; First friction member 3; Second friction member 4; First bracket 5; Second bracket 6; First shaft 7; Second shaft 8; Third shaft 9; Fourth shaft 10; Fifth shaft 11; Notch 12; Protrusion 13; First link 14; Second link 15.

DETAILED DESCRIPTION OF THE EMBODIMENTS

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

In the description of this specification, the phrases "in an example embodiment," "in another example embodiment," or "in some embodiments" refer to one or more of the same or different embodiments consistent with the present disclosure. Those skilled in the art can combine the different embodiments or examples described in this specification or the features of the different embodiments or examples when there is no conflict.

Figure 1:
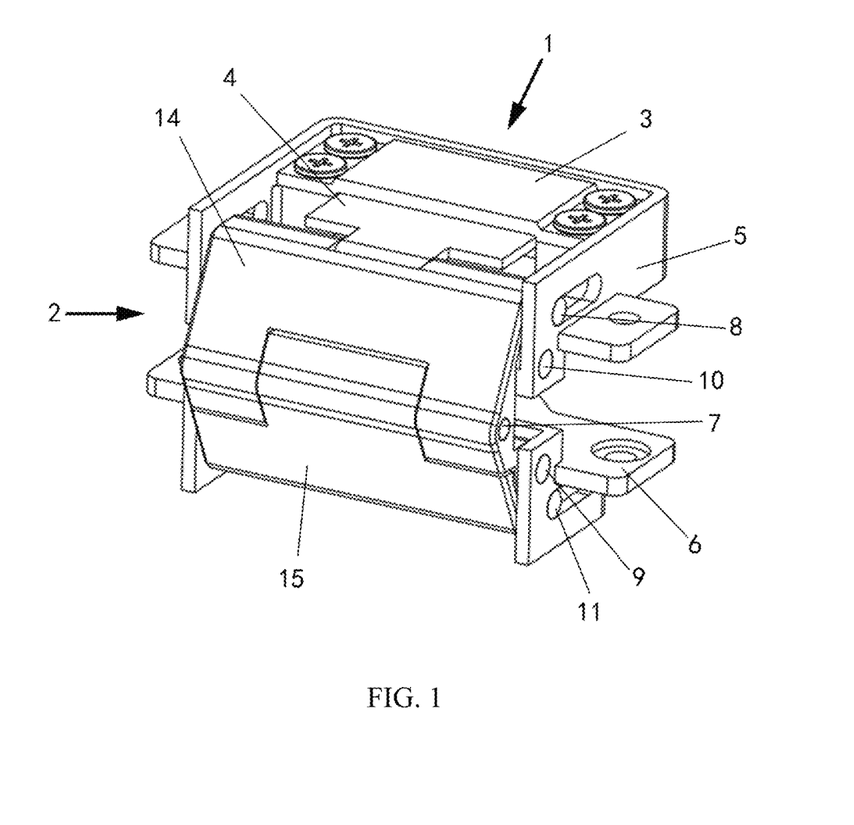
FIG. 1 is a schematic structural diagram of a hinge mechanism consistent with embodiments of the disclosure.
Figure 2:
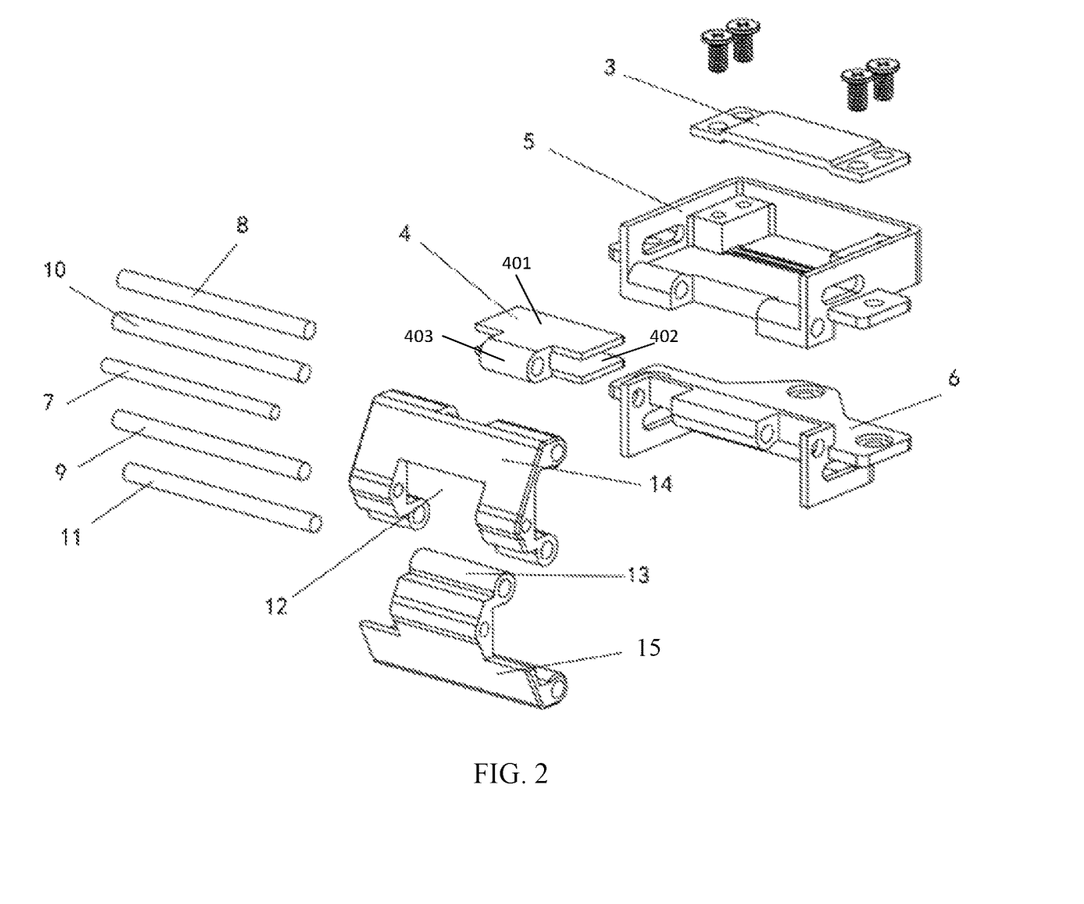
FIG. 2 is an exploded view of the hinge mechanism consistent with embodiments of the disclosure.

FIG. 1 is a schematic structural diagram of a hinge mechanism consistent with the disclosure. FIG. 2 is an exploded view of the hinge mechanism consistent with the disclosure. As shown in FIG. 1 and FIG. 2, the hinge mechanism includes a hinge assembly 1 and a torque assembly 2.

The hinge assembly 1 is used to connect a first body 100 and a second body 200 (see FIG. 6) to rotatably connect the first body 100 and the second body 200. The torque assembly 2 is mounted at the first body 100 and is connected to the hinge assembly 1. When the first body 100 and the second body 200 are relatively rotated to drive an action of the hinge assembly 1, the hinge assembly 1 drives an action of the torque assembly 2 to cause at least a part of the torque assembly 2 to translate relative to the first body 100 to provide a torque for the hinge assembly 1.

For example, the hinge assembly 1 includes a plurality of shafts. The plurality of shafts form a whole that can drive each other and restrain each other. The first body 100 and the second body 200 may be connected to two of the plurality of shafts of the hinge assembly 1, respectively connected, or may be connected to the whole formed by the plurality of shafts, to realizes a rotation connection between the two bodies. The torque assembly 2 is used to provide the torque to the hinge assembly 1. The torque assembly 2 is mounted at the first body 100 and connected to the hinge assembly 1.

When a user rotates the first body 100, the first body 100 drives the hinge assembly 1, and the hinge assembly 1 drives the torque assembly 2, to cause the torque assembly 2 to translate relative to the first body 100 based on the drive of the hinge assembly 1 to generate a friction. The torque is formed for the hinge assembly 1 by the friction, that is, the hinge assembly 1 and the first body 100 are sequentially stagnated by the friction to prevent the first body 100 from continuing to rotate, thereby achieving an effect of a torque of the shaft.

As described in above embodiments, the hinge assembly 1 may drive the torque assembly 2 to translate relative to the first body 100 during movement and generate the friction used to create the torque of the shaft and block a rotation of the first body 100 by the configuration of the torque assembly 2 connected to the hinge assembly 1. Compared with conventional hinge mechanisms that use shaft friction to provide torque, the hinge mechanism consistent with the present disclosure may protect the shaft, extend service life of the shaft, and improve the turning feel when the user turns the first body 100.

Further, as shown in FIGS. 3-6, the hinge assembly 1 is movably connected with the first body 100 and the second body 200, respectively. When the first body 100 and the second body 200 are relatively rotated, for example, when the user rotates the first body 100, one end of the hinge assembly 1 drives the torque assembly 2 and moves along the first body 100 together with the at least a part of the torque assembly 2, and another end of the hinge assembly 1 moves along the second body 200 under a transmission action inside the hinge assembly 1, to cause the first body 100 and the second body 200 to approach each other during the rotation to a coplanar state. Until the first body 100 and second body 200 are in the coplanar state, the distance between the two bodies is the smallest. Thus, when both the first body 100 and the second body 200 are provided with displays, the displays of the two bodies may be approximately seamlessly connected when the two bodies are in the coplanar state, to be combined to form an integral display to meet requirements of the user.

Figure 6:
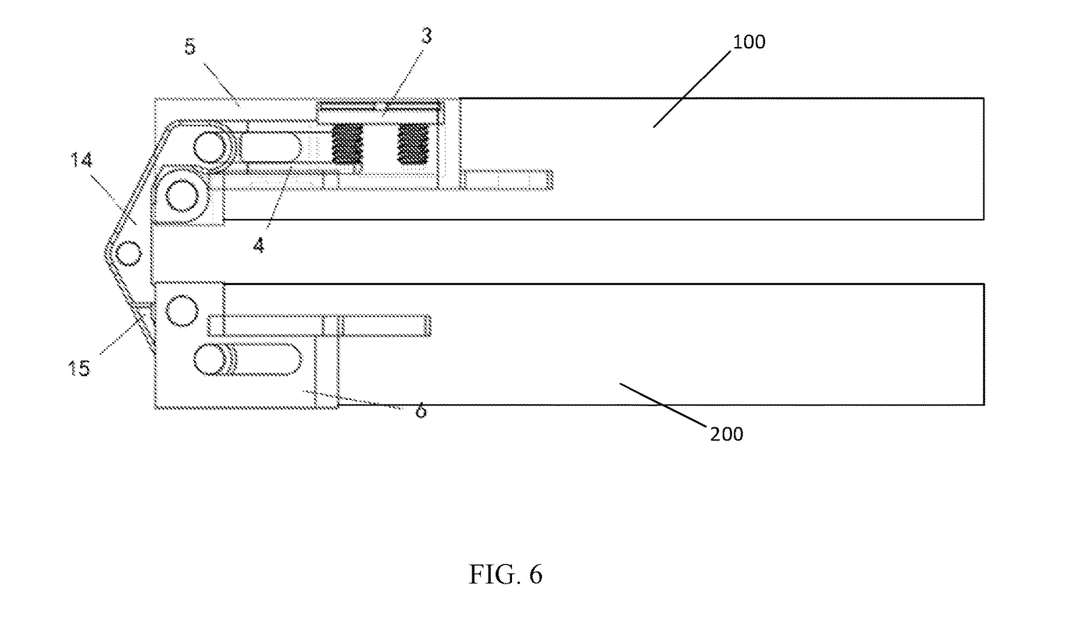
FIG. 6 is a cross-sectional view of the hinge mechanism consistent with embodiments of the disclosure.
Figure 7:
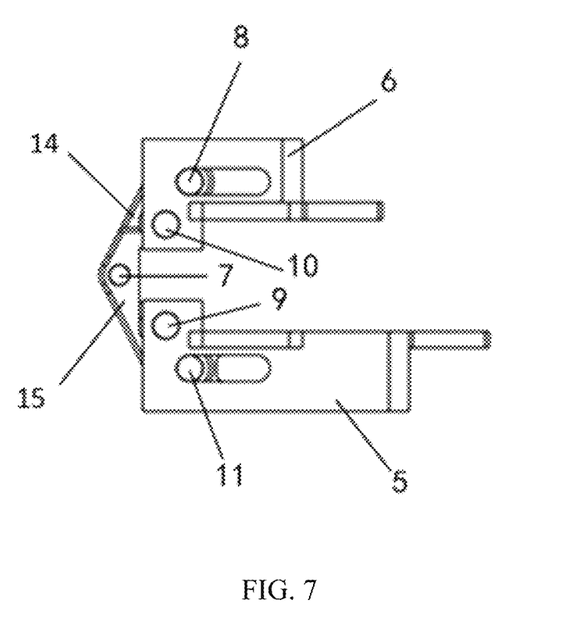
FIG. 7 is a side view of the hinge mechanism in another first rotation state consistent with embodiments of the disclosure.
Figure 8:
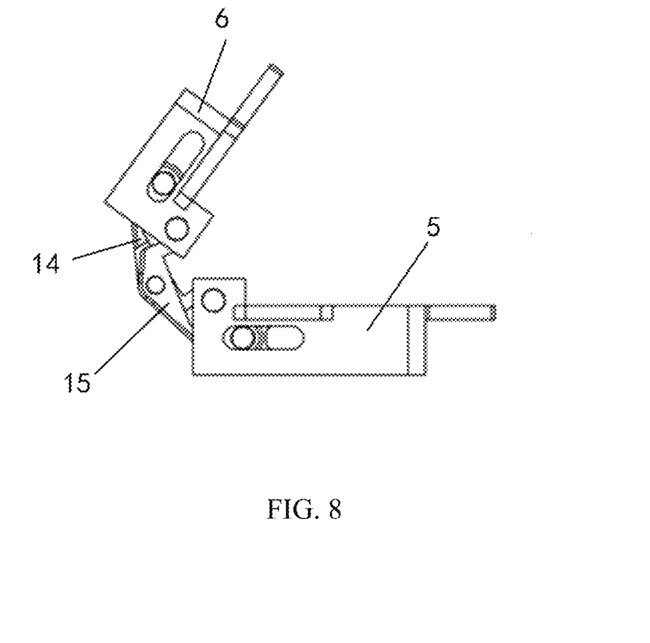
FIG. 8 is a side view of the hinge mechanism in another second rotation state consistent with embodiments of the disclosure.
Figure 9:
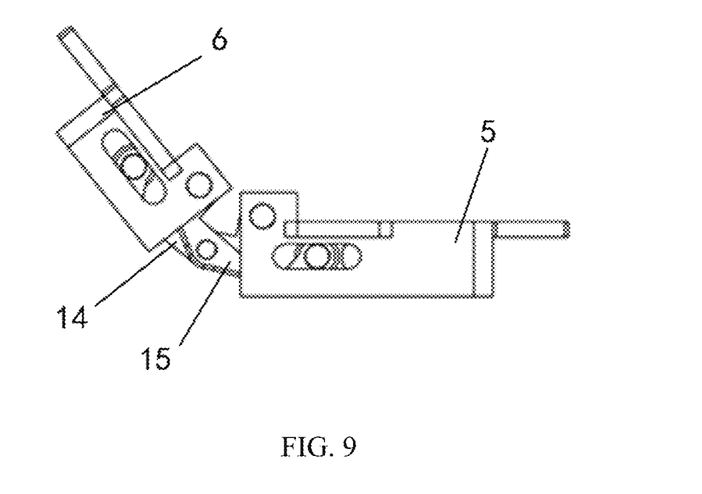
FIG. 9 is a side view of the hinge mechanism in another third rotation state consistent with embodiments of the disclosure.
Figure 10:
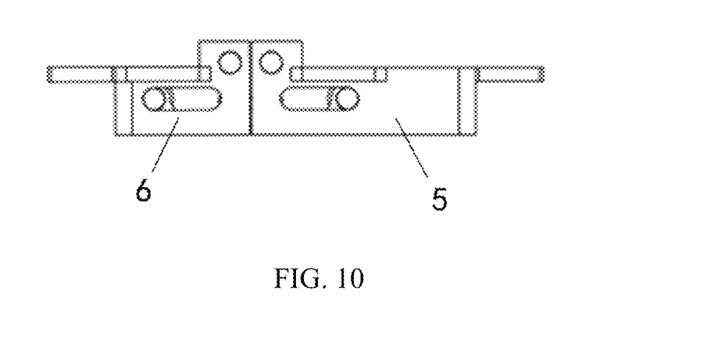
FIG. 10 is a side view of the hinge mechanism in a fourth rotation state consistent with embodiments of the disclosure.

FIG. 6 is a cross-sectional view of the hinge mechanism consistent with embodiments of the disclosure. As shown in FIG. 6, the torque assembly 2 includes a first friction member 3 fixed to the first body 100, and a second friction member 4 connected to the hinge assembly 1. At lease a part of the second friction member 4 is located between the first friction member 3 and the corresponding first body 100, and abuts against the first friction member 3 and the first body 100. When the hinge assembly 1 is rotated, the second friction member 4 is driven to translate along the first friction member 3 and the first body 100, to generate frictions on two opposite sides of the second friction member 4.

As shown in FIG. 2, the first friction member 3 includes a plate, and the second friction member 4 includes two oppositely arranged plates, e.g., a first plate 401 and a second plate 402, and a hollow cylinder 403 connecting the two plates 401, 402 of the second friction member 4. The first friction member 3 may be directly fixed to the first body 100, or indirectly fixed to the first body 100 through another component. The second friction member 4 is connected to the hinge assembly 1. The second friction member 4 may be only partially located between the friction member 3 and the corresponding first body 100 or may be all located between the first friction member 3 and the corresponding first body 100. That is, the first friction member 3 and the corresponding first body 100 enclose a cavity capable of accommodating the second friction member 4. The second friction member 4 is in the cavity and may move relative to the cavity. During the movement of the second friction member 4, a friction is generated when a surface of one of the two plates of the second friction member 4 and a surface of the first friction member 3 are in contact and move relative to each other, and a friction is also generated when a surface of another one of the two plates of the second friction member 4 and a surface of the first body 100 are in contact and move relative to each other. The frictions are generated by the movement and used to create the torque of the shaft. In some embodiments, only one of the surfaces of the second friction member 4 and the first friction member 3 are in contact and move relative with each other to generate friction. To limit the second friction member 4 to prevent the second friction member 4 from deviating from the first friction member 3, a cavity in a similar form to the above-described cavity or another limiting mechanism needs to be formed.

Further, to facilitate disassembly, assembly, and maintenance of the hinge mechanism, the hinge mechanism further includes a first bracket 5 fixed to the first body and a second bracket 6.

The first friction member 3 is mounted at the first bracket 5, and the second friction member 4 is sandwiched between the first friction member 3 and the corresponding first bracket 5 and moves along the first friction member 3 and the first bracket 5 to generate the friction. The one end of the hinge assembly 1 is connected to the second friction member 4 and is movably connected to the first bracket 5.

The second bracket 6 is fixed to the second body, another end of the hinge assembly 1 is movably connected to the second bracket 6, and a part of the hinge assembly located between the two ends is rotatably connected to the first bracket and the second bracket, respectively.

Specifically, as shown in FIG. 1 and FIG. 2, the first bracket 5 may be fixedly mounted at the first body by inlaying or by bolts, and the second bracket 6 may also be fixedly mounted at the second body by inlaying or by bolts. The first bracket 5 has a notch, and the first friction member 3 is fixed at a notch of the notch to cooperate to form a cavity. The second friction member 4 is inserted in the cavity. Two surfaces of the second friction member 4 are in contact with the first friction member 3 and an inner wall of the notch of the first bracket 5, respectively, and generate certain contact pressures. The one end of the hinge assembly 1 is rotatably connected to the second friction member 4 and is movably connected to the first bracket 5. Further, another end of the hinge assembly 1 is movably connected with the second bracket 6, and the part of the hinge assembly 1 located between the first bracket 5 and the second bracket 6 is rotatably connected with the first bracket 5 and the second bracket 6, respectively. When the second body is rotated, the second body drives the hinge assembly 1, and the one end of the hinge assembly 1 drives the first friction member 3 to move along a first direction relative to the second friction member 4 and the first bracket 5 to generate the friction. Because the one end of the hinge assembly 1 is connected to the first friction member 3, the one end of the hinge assembly 1 also moves along the first direction relative to the first bracket 5. Another end of the hinge assembly 1 is driven and dragged by the hinge assembly 1 to move relative to the second bracket 6 along a second direction opposite to the first direction. In this scenario, the first bracket 5 and the second bracket 6 approach or move away from each other relative to the shaft, thereby driving the first body and the second body to approach or move away from each other.

To increase the friction, further increase the torque of the shaft effect, and enhance the feel when the user turns the first body or the second body, the contact surface between the first friction member 3 and the second friction member 4 and the contact surface between the second friction member 4 and the first bracket 5 are flat. The first friction member 3 and the second friction member 4, and/or the second friction member 4 and the first bracket 5 have a structure for increasing friction. The structure is not unique. For example, the structure may be a rib, or a bump, etc.

Further, the hinge assembly 1 may enable the first body and the second body to rotate in cooperation with each other within a range of 0° to 180°. When the first body and the second body are rotated to the coplanar state, the first bracket and the second bracket are driven by the hinge assembly to approach each other, thereby driving the first body and the second body to approach each other. When the first body and the second body are rotated to overlap each other and are in a stacked state, the first bracket 5 and the second bracket 6 are driven by the hinge assembly 1 to move away from each other, thereby driving the first body and the second body to move away from each other.

Figure 3:
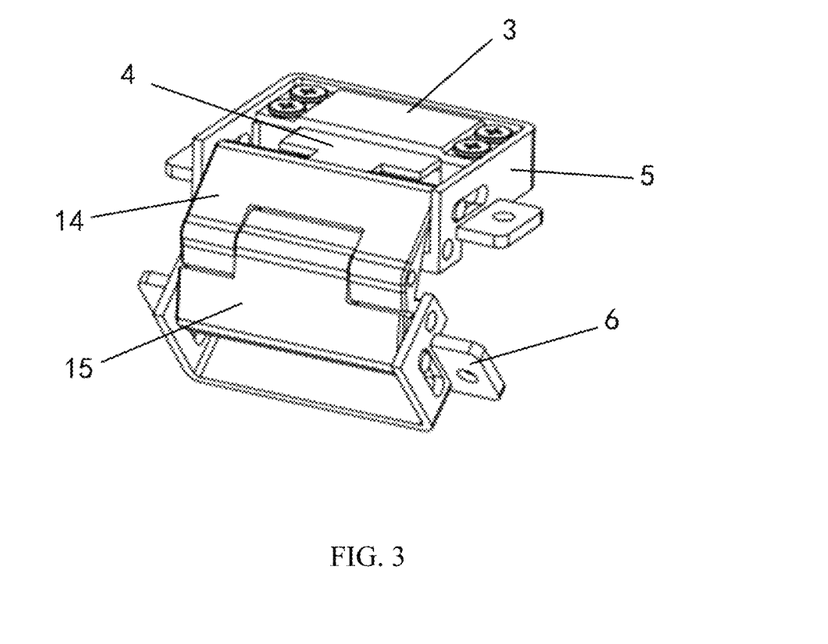
FIG. 3 is a perspective view of the hinge mechanism in a first rotation state consistent with embodiments of the disclosure.
Figure 4:
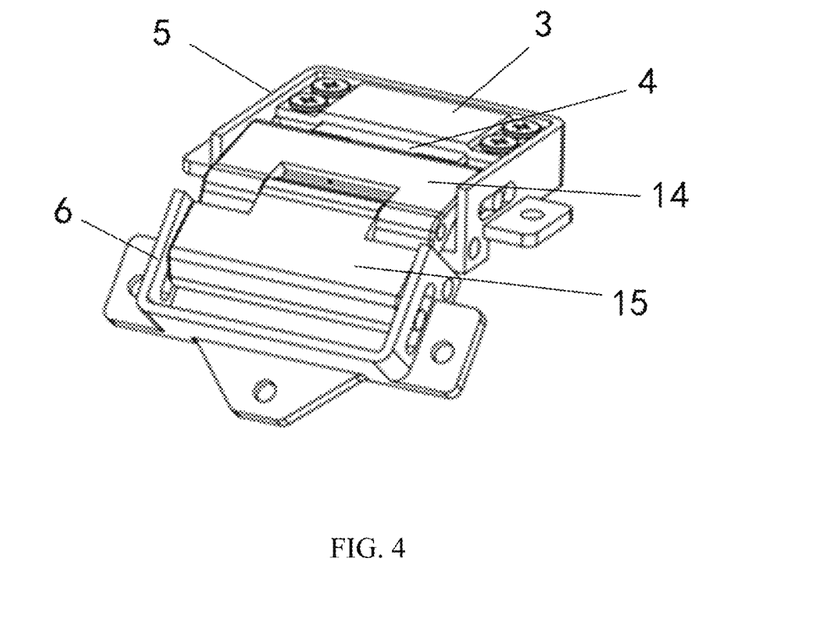
FIG. 4 is a perspective view of the hinge mechanism in a second rotation state consistent with embodiments of the disclosure.
Figure 5:
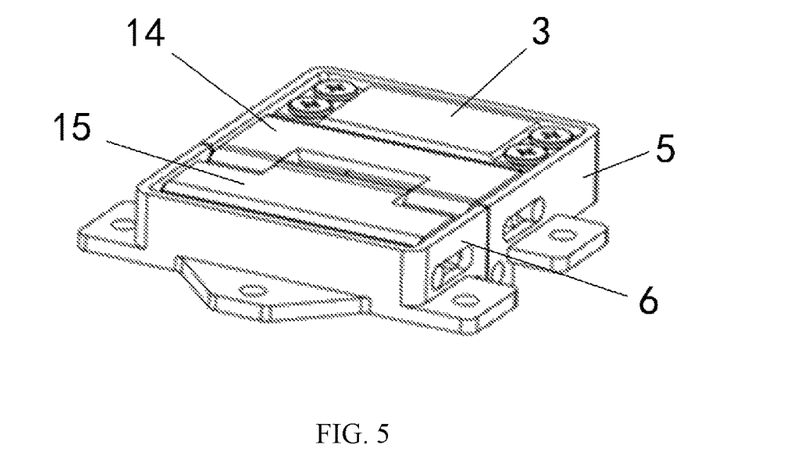
FIG. 5 is a perspective view of the hinge mechanism in a third rotation state consistent with embodiments of the disclosure.

Further, as shown in FIGS. 1, 2, and 3, the hinge assembly 1 includes a plurality of shafts, a link 14, and a second link 15.

The first link 14 and a middle part of the second link 15 are rotatably connected through a first shaft 7. One end of the first link 14 is movably connected to the first bracket 5 through at least a second shaft 8. The torque assembly 2 is connected to the second shaft 8. Another end of the first link 14 is rotatably connected to the second bracket 6 through a third shaft 9. One end of the second link 15 is rotatably connected to the first bracket 5 through a fourth shaft 10. Another end of the second link 15 is movably connected to the second bracket 6 through a fifth shaft 11.

Specifically, the structures of the first link 14 and the second link 15 are shown in FIG. 2. The first link 14 has a notch 12, each of upper part, middle part, and lower part of the first link 14 is provided with a first through hole. The second link 15 has a protrusion 13, each of the protrusion 13, middle part of the second link 15, and lower part of the second link 15 is provided with a second through hole. When the first link 14 and the second link 15 are connected, the protrusion 13 of the second link 15 passes through the notch 12 of the first link 14 and is rotatably connected to the first bracket 5 through the fourth shaft 10. The protrusion 13 of the second link 15 and the corresponding part of the notch 12 are penetrated with the first shaft 7 through the first through hole and the second through hole to realize a rotation connection. That is, the first shaft 7 penetrates the notch 12 of the first link 14 and the protrusion 13 of the second link 15 located in the notch 12 to realize the rotation connection between the first link 14 and the second link 15. The upper part of the first link 14 extends into the first bracket 5, and the first through hole at the upper part and a long hole opened at the first bracket 5 are correspondingly penetrated with the second shaft 8, which can be moved along the long hole at the first bracket 5. The hollow cylinder 403 of the second friction member 4 passes through the first link 14 and is sleeved on the second shaft 8 to realize a connection with the hinge assembly 1. As shown in FIGS. 1, 2 and 3, another end of the first link 14, that is, the lower part of the first link 14, is penetrated with the third shaft 9 through the first through hole. The third shaft 9 is rotatably connected to the second bracket 6 at the same time. Another end of the second link 15, that is, the lower part of the second link 15, is penetrated with the fifth shaft 11 through the second through hole. The fifth shaft 11 is connected to a long hole opened at the second bracket 6 at the same time, and can move along the long hole of the second bracket 6.

Specifically, to better explain the movement process of the hinge mechanism, the following is a detailed description with reference to FIGS. 2, 7, 8, 9, and 10.

Taking a laptop as an electronic device, the first body and the second body are the two bodies of the laptop, respectively, as an example, the first bracket 5 is mounted at the first body, the second bracket 6 is mounted at the second body. The first friction member 3 is fixed to the first bracket 5, and the second friction member 4 is sandwiched between the first friction member 3 and the first bracket 5 and is connected to the end of the hinge assembly 1 facing the first bracket 5 at the same time. The hinge assembly 1 is rotatably connected to the first bracket 5 and the second bracket 6 at the same time, and can move relative to the first bracket 5 and the second bracket 6 at the same time. When the user rotates the second body to open the laptop, the fifth shaft 11 of the hinge assembly 1 drives the second link 15 to move relative to the second bracket 6. The third shaft 9 rotates relative to the second bracket 6, and drives the second link 15 to rotate relative to the first link 14 based on the first shaft 7, and to rotate relative to the first bracket 5 based on the fourth shaft 10. At the same time, the second shaft 8 pushes the second friction member 4 to be moved together along the long hole of the first bracket 5 in the direction extending into the first bracket 5. Because a movement direction of the fifth shaft 11 is opposite to the movement direction of the second shaft 8, the second bracket 6 is moved driven by the second body to gradually approach the first bracket 5 until the two are rotated to the position shown in FIG. 5. That is, the first bracket 5 and the second bracket 6 abut against each other to cause the first body and the second body to abut against each other. When the user rotates the second body to close the laptop, the second shaft 8 and the fifth shaft 11 of the hinge assembly 1 move along the directions opposite to the above movement direction relative to the first bracket 5 and the second bracket 6, respectively, until the two are rotated to the position shown in FIG. 1. That is, corresponding surfaces of the first body and the second body are abutted and stacked on each other.

Another embodiment of the present disclosure also provides an electronic device, which includes a first body, a second body, and the above-described hinge mechanism rotatably connecting the first body and the second body.

Other embodiments of the disclosure will be apparent to those skilled in the art from consideration of the specification and practice of the embodiments disclosed herein. It is intended that the specification and examples be considered as example only and not to limit the scope of the disclosure, with a true scope and spirit of the invention being indicated by the following claims.

What is claimed is:

1. A hinge mechanism comprising:
   a hinge assembly configured to be connected with a first body and a second body to rotatably connect the first body and the second body; and
   a torque assembly being mounted at the first body and connected with the hinge assembly, including:
      a first friction member fixed to the first body; and
      a second friction member connected to the hinge assembly and including two oppositely arranged plates and a hollow cylinder connecting the two oppositely arranged plates, at least a part of the second friction member located between and abutting the first friction member and the first body, two surfaces of the second friction member being in contact with the first friction member and the first body, and generating contact pressures;

wherein:

in response to the first body and the second body being relatively rotated to drive the hinge assembly, the hinge assembly drives the torque assembly to cause the second friction member to translate along the first friction member and the first body to generate frictions on the two surfaces of the second friction member based on the contact pressures to provide a torque for the hinge assembly.

2. The hinge mechanism of claim 1, wherein:

the hinge assembly is movably connected with the first body and the second body, respectively; and in response to the first body and the second body being relatively rotated, one end of the hinge assembly drives the torque assembly and moves along the first body together with the at least a part of the torque assembly, and another end of the hinge assembly moves along the second body, to cause the first body and the second body to approach each other during a rotation to a coplanar state.

3. The hinge mechanism of claim 1, further comprising:

a first bracket fixed to the first body; and a second bracket fixed to the second body;

wherein:

the first friction member is mounted at the first bracket;

the second friction member is sandwiched between the first friction member and the first bracket, and moves along the first friction member and the first bracket to generate the friction;

the one end of the hinge assembly is connected to the second friction member and is movably connected to the first bracket;

the another end of the hinge assembly is movably connected to the second bracket; and a part of the hinge assembly located between the two ends is rotatably connected to the first bracket and the second bracket, respectively.

4. The hinge mechanism of claim 3, wherein a contact surface between the first friction member and the second friction member and a contact surface between the second friction member and the first bracket are both flat, and the first friction member and the second friction member, and the second friction member and the first bracket have a structure for increasing the friction.

5. The hinge mechanism of claim 3, wherein the hinge assembly includes:

a plurality of shafts including a first shaft, a second shaft, a third shaft, a fourth shaft, and a fifth shaft;

a first link; and a second link;

wherein:

the first link and a middle part of the second link are rotatably connected through the first shaft;

one end of the first link is movably connected to the first bracket through the second shaft;

the torque assembly is connected to the second shaft;

another end of the first link is rotatably connected to the second bracket through the third shaft;

one end of the second link is rotatably connected to the second bracket through the fourth shaft; and another end of the second link is movably connected to the second bracket through the fifth shaft.

6. The hinge mechanism of claim 5, wherein the first link has a notch, the second link has a protrusion, and the protrusion passes through the notch and is rotatably connected to the first bracket through the fourth shaft.

7. The hinge mechanism of claim 6, wherein the first shaft passes through the notch of the first link and the protrusion of the second link located in the notch to rotatably connect the first link and the second link.

8. The hinge mechanism of claim 3, wherein the first body and the second body rotate within a range of 0° to 180° using the hinge assembly, and the first bracket and the second bracket are driven by the hinge assembly to approach each other during the rotation to the coplanar state, to drive the first body and the second body to approach each other.

9. An electronic device comprising:

a first body;

a second body; and a hinge mechanism configured to rotatably connect the first body and the second body, including:

a hinge assembly configured to be connected with a first body and a second body to rotatably connect the first body and the second body; and a torque assembly mounted at the first body and connected with the hinge assembly, including:

a first friction member fixed to the first body; and a second friction member connected to the hinge assembly and including two oppositely arranged plates and a hollow cylinder connecting the two oppositely arranged plates, at least a part of the second friction member located between and abutting the first friction member and the first body, two surfaces of the second friction member being in contact with the first friction member and the first body, and generating contact pressures;

wherein:

in response to the first body and the second body being relatively rotated to drive the hinge assembly, the hinge assembly drives the torque assembly to cause the second friction member to translate along the first friction member and the first body to generate frictions on the two surfaces of the second friction member based on the contact pressures to provide a torque for the hinge assembly.

10. The hinge mechanism of claim 9, wherein:

the hinge assembly is movably connected with the first body and the second body, respectively; and in response to the first body and the second body being relatively rotated, one end of the hinge assembly drives the torque assembly and moves along the first body together with the at least a part of the torque assembly, and another end of the hinge assembly moves along the second body, to cause the first body and the second body to approach each other during a rotation to a coplanar state.

11. The hinge mechanism of claim 9, further comprising:

a first bracket fixed to the first body; and a second bracket fixed to the second body;

wherein:

the first friction member is mounted at the first bracket;

the second friction member is sandwiched between the first friction member and the first bracket, and moves along the first friction member and the first bracket to generate the friction;

the one end of the hinge assembly is connected to the second friction member and is movably connected to the first bracket;

the another end of the hinge assembly is movably connected to the second bracket; and a part of the hinge assembly located between the two ends is rotatably connected to the first bracket and the second bracket, respectively.

12. The hinge mechanism of claim 11, wherein a contact surface between the first friction member and the second friction member and a contact surface between the second friction member and the first bracket are both flat, and the first friction member and the second friction member, and the second friction member and the first bracket have a structure for increasing the friction.

13. The hinge mechanism of claim 11, wherein the hinge assembly includes:
a plurality of shafts including a first shaft, a second shaft, a third shaft, a fourth shaft, and a fifth shaft;
a first link; and
a second link;
wherein:
the first link and a middle part of the second link are rotatably connected through the first shaft;
one end of the first link is movably connected to the first bracket through the second shaft;
the torque assembly is connected to the second shaft;
another end of the first link is rotatably connected to the second bracket through the third shaft;
one end of the second link is rotatably connected to the second bracket through the fourth shaft; and
another end of the second link is movably connected to the second bracket through the fifth shaft.

14. The hinge mechanism of claim 13, wherein the first link has a notch, the second link has a protrusion, and the protrusion passes through the notch and is rotatably connected to the first bracket through the fourth shaft.

15. The hinge mechanism of claim 14, wherein the first shaft passes through the notch of the first link and the protrusion of the second link located in the notch to rotatable connect the first link and the second link.

16. The hinge mechanism of claim 11, wherein the first body and the second body rotate within a range of 0° to 180° using the hinge assembly, and the first bracket and the second bracket are driven by the hinge assembly to approach each other during the rotation to the coplanar state, to drive the first body and the second body to approach each other.

* * * * *